Feb. 8, 1966  S. CORNBERG  3,233,346
CARREL

Filed Sept. 13, 1962  2 Sheets-Sheet 1

INVENTOR.
SOL CORNBERG
BY
Arthur H. Seidel
ATTORNEY

Feb. 8, 1966   S. CORNBERG   3,233,346
CARREL
Filed Sept. 13, 1962   2 Sheets-Sheet 2
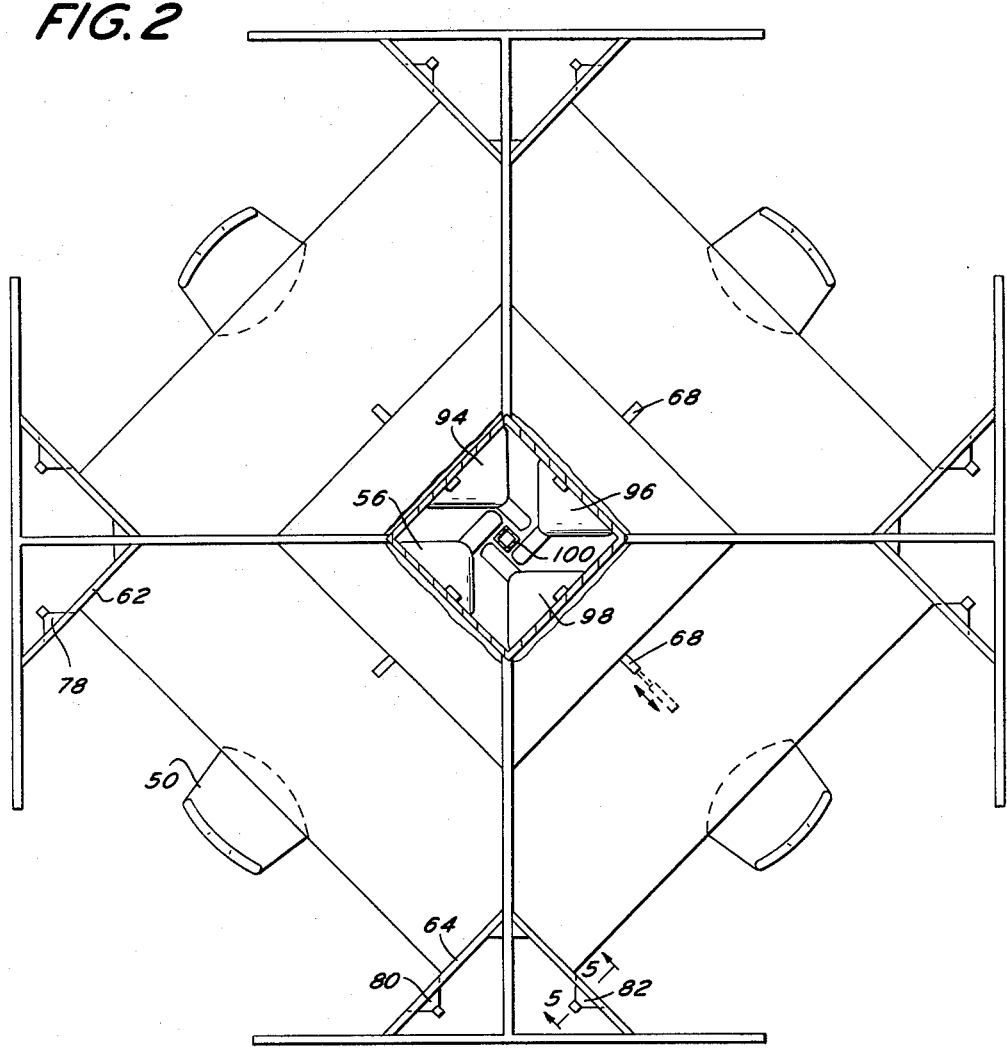
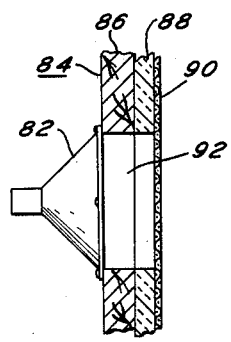
INVENTOR.
SOL CORNBERG
BY
ATTORNEY

United States Patent Office

3,233,346
Patented Feb. 8, 1966

3,233,346
CARREL
Sol Cornberg, 240 Central Park S., New York 19, N.Y.
Filed Sept. 13, 1962, Ser. No. 223,476
3 Claims. (Cl. 35—60)

A carrel is an enclosure for studying. This invention relates to a new and improved carrel which utilizes audio-visual aids to educate a student. More particularly, it relates to a carrel which may be utilized to eliminate the need for educational institutions as we know them today.

During the next ten years, school facilities will be taxed to their utmost and many would-be students will be unable to obtain an adequate education due to the lack of physical educational facilities. The number of teachers per student will decrease and affect the quality of education available.

Additionally, the increase in the student population will make it necessary to have much more information available than is now available in print, or that can readily be stored due to the volume of information which will be necessary. If students are taking a particular course which requires reading a given book, the library of the school must of necessity have enough copies to supply each student with the text. This is a great strain on the size of the library and limits the number of different volumes which the library can store.

At the present time, if a student were to miss a lecture or wish to review a subject which was taught the previous year, he has no way of obtaining a copy of the lecture. By utilizing this invention, he now has readily available a method of obtaining a copy of the lecture.

This invention contemplates the use of carrels provided with audio-visual equipment especially designed for the student. The carrel will have a television picture tube receiver, a selection dial, a microphone, and one or more speakers, for random access to, and display of, stored and/or live audio-visual information. The carrel will be soundproofed so as not to interfere with other activities going on in the neighborhood of the carrel. Since the enclosure will be small, provisions will be made to avoid a feeling of claustrophobia on the part of the student.

In the carrel, the student has his own television monitor, speakers, a dial for selecting the lesson, and a microphone. He will have none of the distractions of a classroom. Today's student learns more easily from a television screen than he does from a book. He is able to relate more easily the information that comes to him from a television screen than from a live teacher. The reason for this, although not truly understood, is probably that the television program is directed only at the student while the teacher in a classroom is speaking to all of the students.

With a television monitor, the student would hear the teacher, see him, and could be directed to illustrations not necessarily in the classroom.

The carrel of the present invention would eliminate the problems of the shy student who does not wish to ask questions in the presence of other students. The shy student need only dial his instructor and speak to him over the microphone to obtain the answers to his questions. Additionally, the student who wishes to draw attention to himself by asking interminable questions will not distract from other students as he is isolated from them.

Through the selection system available to the student, he can obtain access to an enormous mass of information stored on tape or other storage media in a central communications center. The information available may be a live lecture being given, yesterday's lecture, or even a seminar given the previous year. The student can dial a book by volume, or chapter, or page, or even paragraph.

Thus, the unit will have eliminated the need for storing enormous quantities of books. The same information on a given storage tape can be supplied to as many carrels as desired at the same time.

The carrel, although useful in an educational institution, may be installed in individual homes so as to eliminate the need for schools as we know them, in the elementary purpose of passing factual information.

The student utilizing his carrel can record answers to tests given by instructors through the microphone and a central memory unit. If the student makes a mistake, he can erase the information on the memory unit and redo the test. The instructor need only listen to what the student has done, dial back the student, and give his critique of the answer.

Therefore, it is the general object of this invention to provide a new and improved educational facility.

Another object of this invention is to provide a new and better carrel having audio-visual aids therein for educational purposes.

Other objects will appear hereinafter.

For the purpose of illustrating the invention there is shown in the drawings a form which is presently preferred; it being understood, however, that this invention is not limited to the precise arrangements and instrumentalities shown.

FIGURE 2 is a top plan view of the unit shown in FIGURE 1 with the center partially exposed.

FIGURE 5 is a partial cross sectional view taken along lines 5—5 of FIGURE 2.

Figure 1:
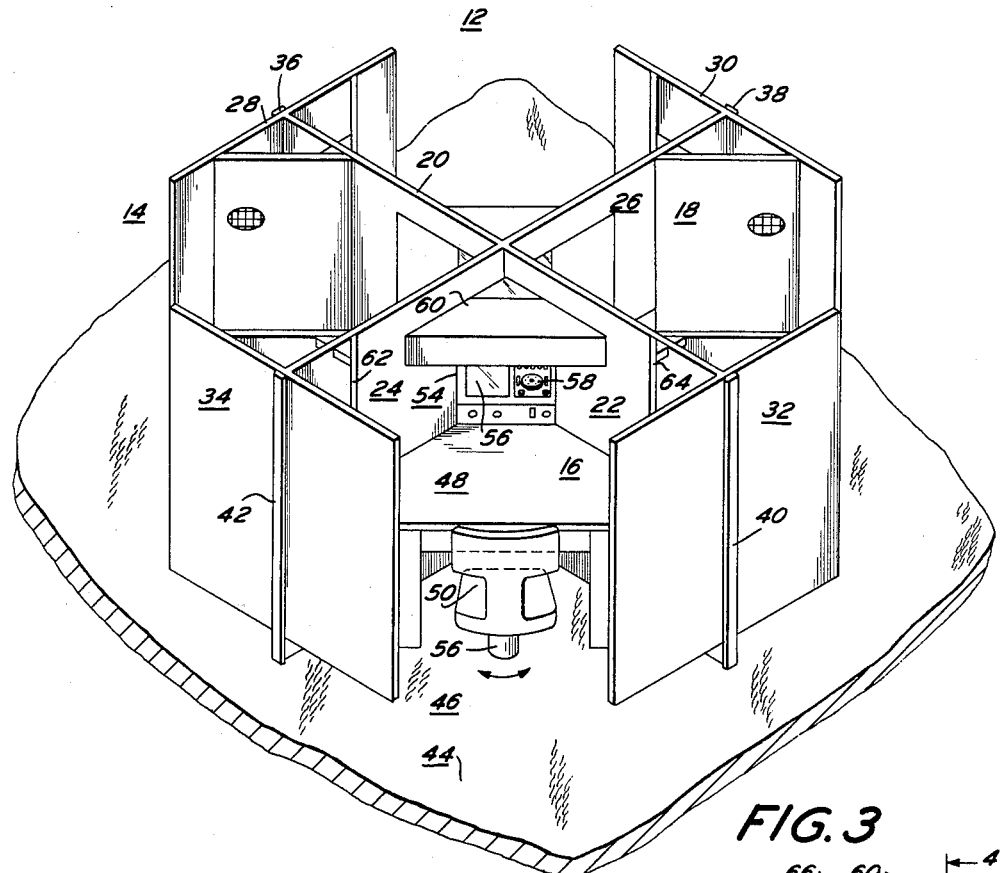
FIGURE 1 is a perspective view of a floor carrel unit utilizing the principles of the present invention.
Figure 4:
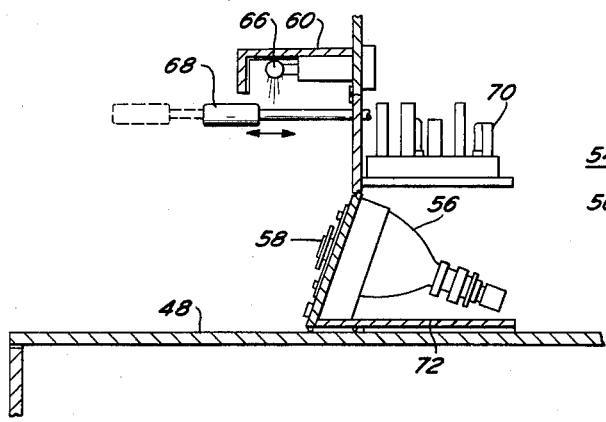
FIGURE 4 is a cross sectional view taken along lines 4—4 of FIGURE 3.
Figure 3:
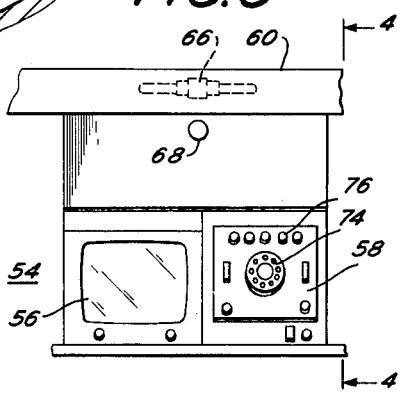
FIGURE 3 is a partial front elevational view of the interior of one carrel.

In FIGURE 1, the four carrel unit built in accordance with the principles of the present invention is generally designated by the numeral 10.

The unit 10 consists of four individual carrels 12, 14, 16 and 18. The carrels are formed by four walls 20, 22, 24 and 26 formed in the shape of a cross and at right angles to each other. Four outer walls 28, 30, 32 and 34 are connected at right angles to the free ends of walls 20, 26, 22 and 24 respectively. These outer walls 28, 30, 32 and 34 do not extend to meet each other so that one corner of each carrel is open to form a doorway.

In a practical embodiment of the present invention, the carrels were five feet in height. Walls 28, 30, 32 and 34 did not touch the floor, but were retained in place by supports 36, 38, 40 and 42. The walls 28, 30, 32 and 34 were spaced approximately ten inches from the floor 44. The floor 44 is preferably carpeted so as to have good sound-absorbing qualities.

There are no ceilings on the individual carrels so as to avoid a feeling of claustrophobia on the part of the student. Since the carrels are to be placed in a room, adequate lighting should be provided so that the student can write without difficulty.

A four carrel unit is shown. However, it can easily be seen that the individual carrels may be in line or back-to-back depending on the architectural problems which are to be solved. Although four carrels have been shown in FIGURE 1, only carrel 16 will be discussed in detail, it being understood that the other carrels are substantially similar in all respects.

Carrel 16 has a desk 48 extending between walls 22 and 24. The desk 48 may have drawers to keep student supplies if desired. A chair 50 is provided which is swivelly mounted on a base 52 fixed to the floor 44. The chair 50 is so fixed so as to center the student between two speaker walls 62 and 64 for reasons to be discussed below.

The student enters through the doorway 46 of carrel 16 to sit in seat 50 at the desk 48. Above the desk 48 and in front of the chair 50 is a study panel 54. The study panel 54 includes a television receiver 56 and a selector unit 58. Above the study panel 54 is a light shield 60. The light shield 60 prevents glare and reflections from the light in the room from distorting or otherwise impairing the picture on the television screen 56.

A lamp 66 is provided underneath the light shield 60 to be utilized by the student as an extra light source when the television receiver is not turned on. A microphone 68 is provided on the study panel 54 so that the student may call an instructor and speak to him when he desires. The microphone may be retractable as shown. It can be used by the student to record information and listen to recorded information. If done simultaneously with parallel audio track, it may be utilized to guide him in pronunciation, in languages, or in speech correction. The information can be listened to by the instructor with or without the consent of the pupil. The microphone can also be used by the student when he answers questions on a test given by the instructor.

Above the television 56, there is provided room and support for a television chassis 70. The television receiver 56 and selector panel 58 are mounted on a slidable guide 72 so that they may be easily moved forward for servicing.

The selector panel 58 includes a dial 74 which the student may utilize to dial a desired program. It will be understood that many other types of selector dials could be utilized in accordance with the principles of the present invention. Push buttons 76 are provided on the selector panel 58 to allow the student to turn the unit on or off, actuate the light 66, or control the volume, sound and/or the brightness of the television picture tube receiver. Also, the push buttons may be utilized to direct the output of the microphone 68 to a recording unit where such could be stored. Another button 76 on the selector panel 58 could be utilized for erasing such information if desired.

The sound panels 62 and 64 have mounted thereon speakers 78 and 80 respectively. The speakers 78 and 80 are directed toward the position where the head of the student is normally placed. For this reason, the chair 50 has been fixed in place so as not to vary the normal head position of the student.

This position of the head of the student prevents audio feedback between the two speakers and the microphone. Additionally, the speakers may be made to supply sound 180 degrees out of phase with each other so as to cancel out any sound not blocked by the head of the student. This cancellation will also avoid audio feedback and decrease the sound in the room.

The walls 24 and 34 are made of a very thick material so as to provide a large mass behind the speaker and prevent sound from entering the adjoining carrel.

In FIGURE 5, there is shown a cross section of a typical speaker 82 mounted on a wall 84. The wall 84 consists of a heavy mass such as ¾ inch plywood which has on its face a layer 88 of sound-absorbing material. Over the sound-absorbing layer 88, there is placed a perforated metal sheeting 90 which protects the cone of the speaker 82 and aids in sanitary maintenance of the carrel.

If desired, the speakers may have separate enclosures to direct the sound into the carrel and better absorb any sound which might tend to go into the wrong unit. The speaker walls 62 and 64 might also be useful as a bulletin board for placing information about specific courses offered and the dial codes for them.

If a student has impaired hearing, a jack can be provided on the selector panel for connecting a set of ear phones which would disconnect the speakers in the carrel.

As shown in FIGURE 2, the center of the floor unit carrel can easily be adapted to support four separate television receivers 56, 94, 96 and 98. A coaxial cable conduit 100 is also provided in the center of the floor carrel unit to connect the selector panel and television receiver with a central communication center.

Dialing means for selecting information stored on magnetic tapes or other storage media are well-known in the art and have not been illustrated as any such unit known to one skilled in the art could be utilized in accordance with the principles of the present invention. In addition to communicating with a central storage unit, a student can dial an instructor in his room. The instructor would have a microphone and television transmitter so that he could speak to and be seen by the student directly.

In this manner, a small number of instructors can service an extremely large number of students for their educational neds. In addition, the student would have the advantages of readily accessible information either in the form of lectures or printed material. The better instructors will be able to reach a far larger number of students than was possible heretofore. Furthermore, a student could select a previous lecture which he wished to review by dialing it on the selector panel 58.

The carrel of the present invention is not limited to use by educators per se, but could find its place in industry as a tool in a research center for random access to stored audio and visual information.

The present invention may be embodied in other specific forms without departing from the spirit or essential attributes thereof, and accordingly, reference should be made to the appended claims, rather than to the foregoing specification as indicating the scope of the invention.

I claim:

1. A carrel comprising a walled enclosure, said enclosure having an opening in one wall thereof, a planar work area in said enclosure extending between at least two oppositely disposed walls of said enclosure, a television receiver against the wall of said enclosure opposite from said opening, a microphone adjacent said planar work area, said planar work area having one edge adjacent said opening extending between said two oppositely disposed walls, at least two speakers located in said oppositely disposed walls adjacent said planar work area edge in a plane parallel to and slightly above said planar work area, and a selector panel for controlling said microphone, said speakers, said television receiver, and said selector panel being located adjacent said work area, and a light shade mounted over said television receiver and extending out of the wall of said enclosure which said television receiver is against.

2. The carrel comprising a walled enclosure, said enclosure having first, second and third walls, said second and third walls being sound dampened, the planes of said second and third walls being perpendicular one to the other, the edges of said second and third walls closest to one another being joined to opposite end edges of said first wall, said enclosure having fourth and fifth walls parallel to one another and having their edges closest to said first wall joined to the edges of said second and third walls furthest from said first wall, a planar work area extending between the walls of said enclosure, said fourth and fifth walls having speakers therein, audio-visual communication apparatus mounted in said first wall, and selector apparatus located adjacent said work area for controlling said audio-visual communication apparatus.

3. The carrel of claim 2 including a light shade, said light shade being mounted above said audio-visual communication apparatus and extending between said first, second and third walls.

References Cited by the Examiner

UNITED STATES PATENTS

| | | | |
|---|---|---|---|
| 1,855,146 | 4/1932 | Jones | 181—0.5 |
| 2,334,776 | 11/1943 | King et al. | 35—60 |
| 3,069,789 | 12/1962 | Knight et al. | 35—35 |

FOREIGN PATENTS 463,045   1915   France.

OTHER REFERENCES

Radio-Electronics, pp. 70–71 relied on, August 1954 issue.

Foreign Language Laboratories in Schools and Colleges, 1958, pp. 12 and 52.

Language Laboratory Learning by Fernand L. Marty, p. 188 relied on, July 25, 1961.

Foreign Language Laboratories in Schools and Colleges; a pamphlet by U.S. Dept. of H.E.W., Bulletin 1959, No. 3, U.S. Government Printing Office 1958, pp. 27, 28 and 29 relied on.

A Language Laboratory Handbook for 1956 from the G.W. University Library, p. 35 relied on.

Language Laboratory Learning by Fernand L. Marty, p. 193 relied on, received Scientific Library July 25, 1961.

EUGENE R. CAPOZIO, *Primary Examiner.*

LEO SMILOW, JEROME SCHNALL, LEONARD W. VARNER, *Examiners.*